US007452188B2

(12) United States Patent
Bouchard

(10) Patent No.: US 7,452,188 B2
(45) Date of Patent: Nov. 18, 2008

(54) PRE-STRETCHED TIE-BOLT FOR USE IN A GAS TURBINE ENGINE AND METHOD

(75) Inventor: Guy Bouchard, Mont St-Hilaire (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 488 days.

(21) Appl. No.: 11/234,179

(22) Filed: Sep. 26, 2005

(65) Prior Publication Data

US 2007/0286733 A1 Dec. 13, 2007

(51) Int. Cl.
*B64C 11/04* (2006.01)

(52) U.S. Cl. ............................... 416/204 R; 416/244 A

(58) Field of Classification Search ................. 416/135, 416/198 A, 204 R, 244 A
See application file for complete search history.

(56) References Cited

U.S. PATENT DOCUMENTS 2,452,782 A 11/1948 McLeod et al.
2,654,565 A 10/1953 Feilden
2,861,823 A * 11/1958 Perry ......................... 416/135
3,051,437 A * 8/1962 Morley et al. ........... 416/198 R
3,677,662 A * 7/1972 Cronstedt ............... 416/244 R
3,976,399 A 8/1976 Schmoch
4,011,737 A 3/1977 Kruger et al.
4,191,485 A 3/1980 Samurin et al.
4,235,568 A 11/1980 Zenkner
4,247,256 A 1/1981 Maghon
4,349,291 A 9/1982 Geary, Jr.
4,836,750 A 6/1989 Modafferi et al.
4,915,589 A 4/1990 Gessler et al.
5,163,816 A 11/1992 Goetzke et al.
5,220,784 A 6/1993 Wilcox
5,537,814 A 7/1996 Nastuk et al.
5,628,621 A 5/1997 Toborg
5,961,246 A 10/1999 Mitsubori
6,276,124 B1 8/2001 Soh et al.
6,481,917 B1 11/2002 Chen et al.
6,481,970 B2 11/2002 Mukherjee et al.
6,663,343 B1 12/2003 Anderson
7,147,436 B2 * 12/2006 Suciu et al. ............. 416/198 A

* cited by examiner

*Primary Examiner*—Igor Kershteyn
(74) *Attorney, Agent, or Firm*—Ogilvy Renault LLP

(57) ABSTRACT

The tie-bolt comprises an elongated tubular portion and a retaining portion coaxially and rigidly attached to the tubular portion. The retaining portion has an outer diameter larger than that of the tubular portion. An annular spacer is removably provided between the retaining portion and the component to be secured by the tie-bolt.

22 Claims, 2 Drawing Sheets

PRE-STRETCHED TIE-BOLT FOR USE IN A GAS TURBINE ENGINE AND METHOD

TECHNICAL FIELD

The field of invention relates generally to the design of a pre-stretched tie-bolt for use in gas turbine engines and, more particularly, to an improved tie-bolt and a method of mounting the same.

BACKGROUND OF THE ART

A tie-bolt is used in a gas turbine engine to secure some of the components mounted around a shaft. The tie-bolt is coaxially mounted at the end of the shaft.

The tie-bolts are initially pre-stretched when mounted in a gas turbine engine. The pre-stretching ensures a very strong hold of the component or components to be retained and is required to compensate for the thermal expansion of the tie-bolt due to the surrounding heated environment.

Traditionally, the pre-stretching requires that a nut be positioned by hand along the tie-shaft while the tie-bolt is pulled using an hydraulic actuator. The nut is rotated until it abuts the component to be held. The problem is that the final position of the nut will not necessarily be exactly the same from one engine to other due to various factors. As a result, the pre-stretching force varies within a given range from one engine to another. This generally requires that the pre-stretching be higher than required so as to ensure a minimal pre-stretching level at all times.

Accordingly, there is a need to provide an improved tie-bolt and an improved method that allow the pre-stretching to be more precise than with conventional arrangements.

SUMMARY OF THE INVENTION

In one aspect, the present invention provides a tie-bolt for securing a component in a gas turbine engine, the tie-bolt comprising: an elongated tubular portion having a first and a second end; a retaining portion having a first and a second end, the first end of the retaining portion being coaxially and rigidly attached to the second end of the tubular portion, the retaining portion having an outer diameter larger than that of the tubular portion; and an annular spacer removably provided between the retaining portion and the component to be secured by the tie-bolt.

In another aspect, the present invention provides a tie-bolt for use in a gas turbine engine having a main shaft, the tie-bolt comprising: an elongated tubular portion having a first and a second end; means for connecting the first end of the tubular portion to the main shaft; a retaining portion having a first and a second end, the first end of the retaining portion being coaxially and rigidly attached to the second end of the tubular portion, the retaining portion having a diameter larger than that of the tubular portion; means for connecting the retaining portion to means for pulling the tie-bolt; and an annular spacer removably provided between the retaining portion and the structure to be retained by the tie-bolt, the annular spacer having a thickness corresponding to a required elongation of the tie-bolt.

In another aspect, the present invention provides a method of mounting a tie-bolt to a main shaft in a gas turbine engine, the tie-bolt having opposite first and second ends, the method comprising: threading a first end of the tie-bolt on the main shaft until the tie-bolt abuts a component to be retained; exerting an axial pulling force at the second end of the tie-bolt for stretching the tie-bolt with reference to the first end thereof, thereby creating an axial spacing between the tie-bolt and the component to be retained; inserting a spacer in the axial spacing; and releasing the axial pulling force.

Further details of these and other aspects of the present invention will be apparent from the detailed description and accompanying figures.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
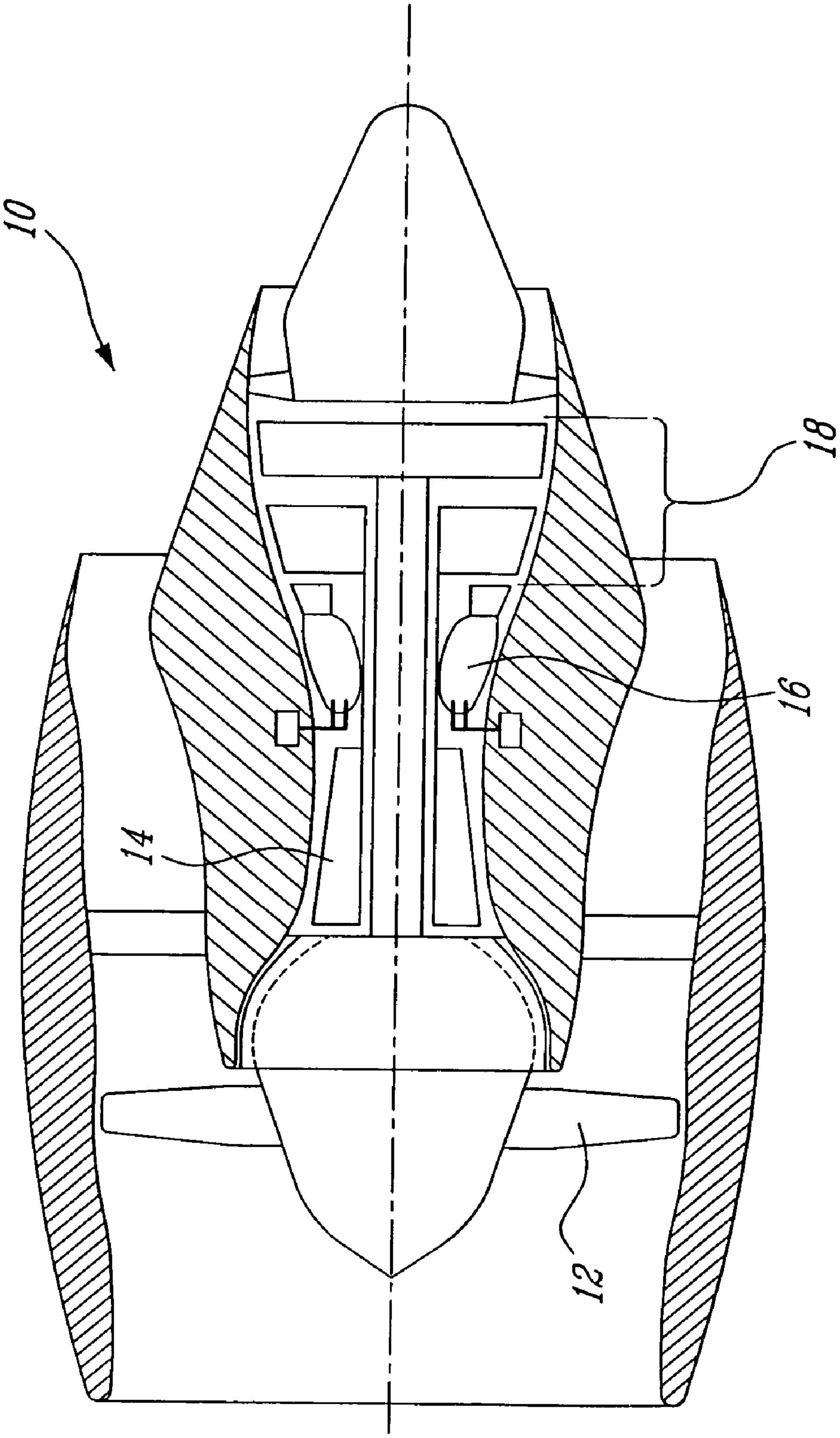
FIG. 1 is a schematic view of a gas turbine engine showing an example of a possible environment in which pre-stretched tie-bolts can be used.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
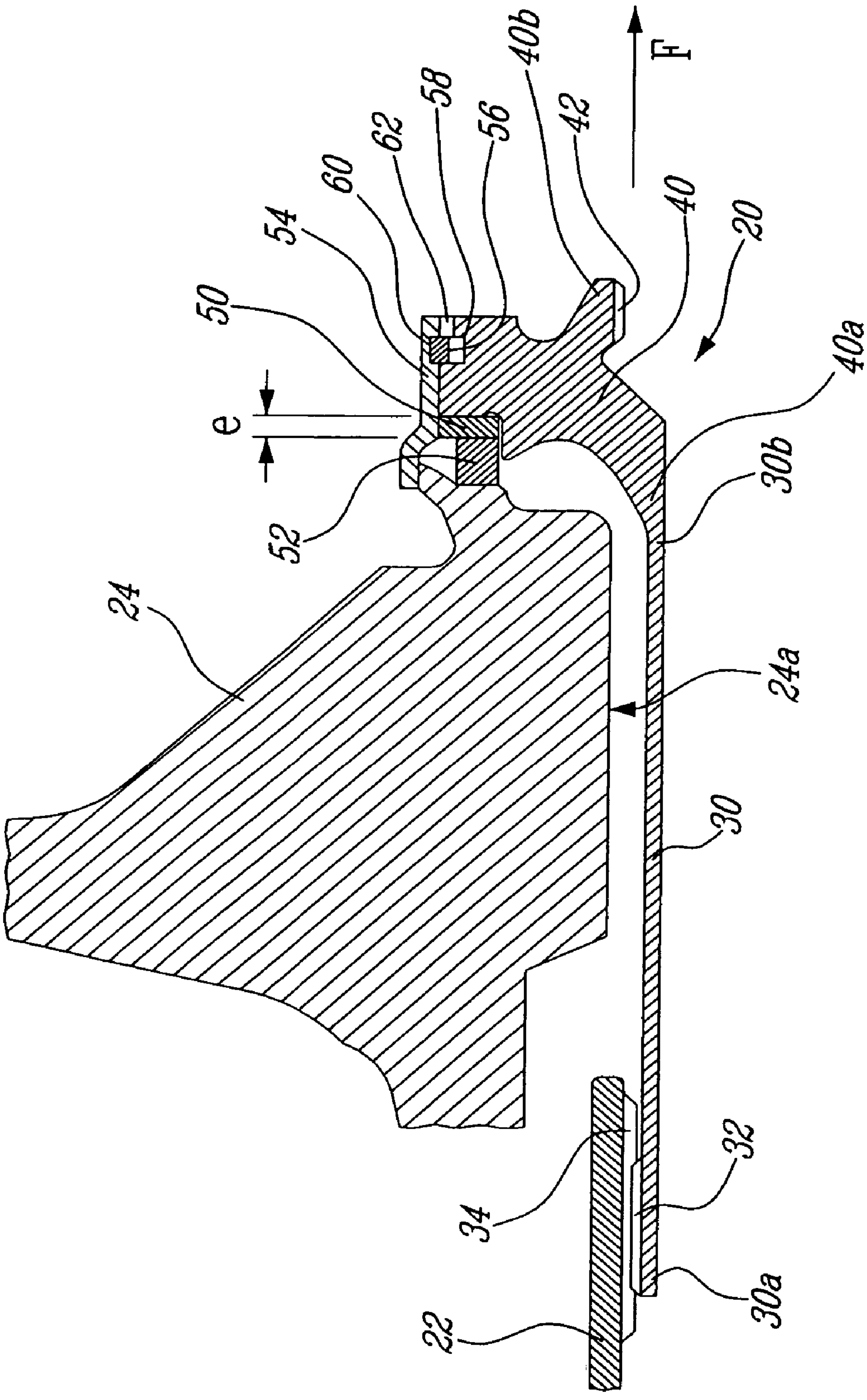
FIG. 2 is a cross-sectional view of an example of a tie-bolt in accordance with a possible embodiment of the present invention.

FIG. 2 shows an example of a tie-bolt 20 in accordance a possible embodiment. This tie-bolt 20 is designed to secure one or more components at the end of a main shaft 22. These components include one or more discs that are part of a turbine rotor or a compressor rotor. Other kinds of components can also be secured to the main shaft 22 by the tie-bolt 20. In FIG. 2, the tie-bolt 20 retains a rotor disc 24.

The tie-bolt 20 comprises an elongated tubular portion 30 having two opposite ends 30*a*, 30*b*. The first end 30*a* is configured to be connected to a main shaft 22 of the engine 10 using a suitable attachment, for instance external threads 32 in mesh with corresponding internal threads 34 provided inside the main shaft 22. The tubular portion 30 coaxially extends through a central bore 24*a* of the component to be retained.

The second end 30*b* of the tubular portion 30 is attached to a retaining portion 40. FIG. 2 shows that the second end 30*b* of the tubular portion 30 is made integral with a first end 40*a* of the retaining portion 40. Both portions 30, 40 can also be otherwise connected together, for instance being bolted, welded, etc. The retaining portion 40 has an outer diameter larger than that of the tubular portion 30. This larger outer diameter is also larger than the central bore 24*a* of the component 24. This provides a location for applying a force on the side of the component 24. When more than one component is present, the force is applied on the side of the last component since the components are usually provided side by side. This force urging the component 24 toward the main shaft 22 is due to a pre-stretching made in the tie-bolt 20.

In use, the pre-stretching is generated using an hydraulic actuator, or a similar system, that is attached at a second end 40*b* of the retaining portion 40 during the assembly. Internal threads 42 at the second end 40*b* of the retaining portion 40 act as a connection point for the hydraulic actuator. Other kinds of attachments are possible. The hydraulic actuator exerts a pulling force F on the tie-bolt 20, thereby causing the tie-bolt 20 to stretch. The main shaft 22 is strongly held in place during the stretching. The hydraulic actuator stretches the tie-bolt 20 of more than the elongation required to produce the desired pre-stretching. Of course, the elongation remains in the elastic deformation range. An annular spacer 50 is then inserted in the spacing created between the component 24 and the retaining portion 40. The spacer 50 can be C-shaped or be in the form of two or more segments. The thickness of the spacer 50 is chosen so that once the pulling force F is released, the remaining elongation of the tie-bolt 20, due to the presence of the spacer 50 and represented in FIG. 2 as "e", equals the elongation required to generate the desired level of pre-stretching.

In the embodiment of FIG. 2, a cooling ring 52 is provided between the component 24 and the spacer 50. The cooling ring 52 is made of a rigid material having a low thermal conductivity and is essentially used to lower the transmission of heat from the component 24 to the tie-bolt 20.

Initially, before pulling the tie-bolt 20, the tie-bolt 20 is manually threaded on the main shaft 22 until the retaining portion 40 abuts the cooling ring 52. The pre-stretching can then be accurately controlled in spite of the manual threading of the tie-bolt 20 since the manual operation is made before the pre-stretching.

Although the friction between the spacer 50 and the adjacent parts is very important once the tie-bolt 20 is pre-stretched, a system is provided for preventing the spacer 50 from moving outward under the centrifugal force. In the illustrated embodiment, this system comprises a locking ring 54 inserted over the retaining portion 40. The locking ring 54 has an edge in contact with the component 24 to also prevent it from moving outwards. The locking ring 54 is itself locked in position using a retaining C-shaped ring 56 biased towards the outside. The C-shaped ring 56 is initially positioned in a slot 58 provided in the retaining portion 40 of the tie-bolt 20. A complementary slot 60 is provided in the locking ring 54. The C-shaped ring 56 enters the slot 60 of the locking ring 54 once the locking ring 54 is at or near its final position. Ports or slots 62 are provided at the end of the tie-bolt 20 so that a tool can be inserted to force the C-shaped ring 56 out of the slot 60 of the locking ring 54 and thereby allowing the locking ring 54 to be removed.

The above description is meant to be exemplary only, and one skilled in the art will recognize that changes may be made to the embodiments described without departing from the scope of the invention disclosed. For example, the exact shape of the tie-bolt 20 can be different that what is shown in FIG. 2. The use of the cooling ring 52 is optional. The system for retaining the spacer 50 can be different to what is shown and described. Similarly, other systems for preventing the locking ring 54 from moving axially can be provided. The position of the threads between the various ports can be inverted. For instance, the main shaft 22 may have external threads, whereas the tie-shaft 20 would then have internal threads. Still other modifications which fall within the scope of the present invention will be apparent to those skilled in the art, in light of a review of this disclosure, and such modifications are intended to fall within the appended claims.

What is claimed is:

1. A tie-bolt assembly for securing a rotor in a gas turbine engine, the tie-bolt assembly comprising:

an engine main shaft;

a rotor mounted about the main shaft, the rotor having a central bore therethrough;

a tie-bolt mounted to the main shaft, the tie-bolt having an elongated tubular portion having a first and a second end, the first end mounted to the main shaft, the elongated portion extending through the central bore, the tie-bolt having a retaining portion having a first and a second end, the first end of the retaining portion being unitary with the second end of the tubular portion, the retaining portion having an outer diameter larger than that of the tubular portion;

an annular spacer removably provided between the retaining portion and the rotor; and wherein the tie-bolt is in an axial-pretension condition when mounted to the rotor and wherein said pretension at least partially maintains the annular spacer between the retaining portion and the rotor.

2. The tie-bolt assembly as defined in claim 1, further comprising a locking ring to be mounted around the spacer to prevent the spacer from moving outwards.

3. The tie-bolt assembly as defined in claim 2, further comprising a removable and outwardly-biased C-shaped ring provided in complementary slots made between the retaining portion and the locking ring for preventing the locking ring from moving.

4. The tie-bolt assembly as defined in claim 1, further comprising a thermally insulated member interposed between the spacer and the rotor.

5. The tie-bolt assembly as defined in claim 1, wherein the tubular portion and the retaining portion are made integral with each other.

6. A tie-bolt for use in a gas turbine engine having a main shaft, the tie-bolt comprising:

a rotor having a central bore;

an elongated tubular portion having a first and a second end and configured to pass through the central bore;

an apparatus for connecting the first end of the tubular portion to the main shaft;

a retaining portion having a first and a second end, the first end of the retaining portion being unitary with the second end of the tubular portion, the retaining portion having a diameter larger than that of the tubular portion;

an apparatus on the retaining portion for connection to a device pulling the tie-bolt; and an annular spacer removably provided between the retaining portion and the rotor, the tie-bolt having a pretension to retain the spacer against the rotor, the annular spacer having a thickness corresponding to a required elongation of the tie-bolt to achieve a desired value for said tie-bolt pre-tension.

7. The tie-bolt as defined in claim 6, further comprising an apparatus for restricting radial movement of the spacer.

8. The tie-bolt as defined in claim 7, wherein the apparatus for restricting movement of the spacer comprises a locking ring mounted on the retaining portion.

9. The tie-bolt as defined in claim 6, further comprising a thermally insulating member between the spacer and the rotor.

10. A method of mounting a tie-bolt to a main shaft in a gas turbine engine, the tie-bolt having opposite first and second ends, the method comprising:

threading a first end of the tie-bolt on the main shaft until the tie-bolt abuts a component to be retained;

exerting an axial pulling force at the second end of the tie-bolt for stretching the tie-bolt with reference to the first end thereof, thereby creating an axial spacing between the tie-bolt and the component to be retained;

inserting a spacer in the axial spacing; and then releasing the axial pulling force.

11. The method as defined in claim 10, further comprising:

mounting a locking ring around the spacer to prevent the spacer from moving outwards.

12. The method as defined in claim 11, further comprising: mounting a removable and outwardly-biased C-shaped ring to prevent the locking ring from moving.

13. The method as defined in claim 10, further comprising: inserting a thermally insulated component between the spacer and the a rotor retained by the tie-bolt.

14. The method as defined in claim 10, further comprising the step of selecting said spacer with a width configured to provide an elongation of the tie-bolt associated with a desired level of pre-stretching of the tie-bolt.

15. A rotor assembly comprising:

an engine main shaft having an axis, the axis defining an axial direction;

a turbine rotor mounted about the main shaft, the main shaft passing through a central bore of the rotor, the rotor having an aft face;

a tie-bolt having a forward end coaxially mounted to an aft end of the main shaft, the tie-bolt extending co-axially through the rotor central bore to an aft end of the tie-bolt, the tie-bolt having a face adjacent the tie-bolt aft end which face opposes the rotor aft face, the tie-bolt having a portion configured to be engaged by an axial pretensioning apparatus, the tie-bolt being in an axial pre-stretched state when initially mounted to the rotor assembly; and a spacer disposed between the rotor aft face portion and the tie-bolt face and there maintained at least partially by compression between the rotor aft face and the tie-bolt face, wherein the spacer has a thickness configured to maintain a desired axial pre-stretching on the tie-bolt when a load of the axial pretensioning apparatus is released.

16. The rotor assembly as defined in claim 15, wherein the tie-bolt face extends radially outwardly of the rotor central bore.

17. The rotor assembly as defined in claim 16, wherein the tie-bolt first end and tie-bolt face are provided on a unitary body.

18. The rotor assembly as defined in claim 16, further comprising a component disposed between the spacer and the rotor aft face, the component composed of a low thermal conductivity material and thereby configured to insulate the spacer from the rotor.

19. The rotor assembly as defined in claim 16, further comprising a ring disposed around the spacer and the ring is thereby configured to impede radial expansion of the spacer.

20. The rotor assembly as defined in claim 19, wherein the ring is further disposed around a portion of the rotor adjacent the aft face and the ring is thereby configured to impede radial movement of a portion of the rotor having the aft face.

21. The rotor assembly as defined in claim 16, wherein the tie-bolt having a portion configured to be engaged by an axial pretensioning apparatus comprises threads disposed at a second end of the tie bolt.

22. The rotor assembly as defined in claim 21, wherein the threads are disposed on radially inward face of the tie-bolt.

* * * * *